United States Patent
Caranto

(10) Patent No.: US 10,040,519 B2
(45) Date of Patent: Aug. 7, 2018

(54) ACCESSORY MOUNTING SYSTEM FOR A STAND UP PADDLE BOARD

(71) Applicant: Todd Caranto, Santa Clarita, CA (US)

(72) Inventor: Todd Caranto, Santa Clarita, CA (US)

(73) Assignee: Todd Caranto, Santa Clarita, CA (US)

(*) Notice: Subject to any disclaimer, the term of this patent is extended or adjusted under 35 U.S.C. 154(b) by 65 days.

(21) Appl. No.: 15/074,478

(22) Filed: Mar. 18, 2016

(65) Prior Publication Data

US 2016/0272286 A1  Sep. 22, 2016

Related U.S. Application Data

(60) Provisional application No. 62/207,199, filed on Aug. 19, 2015, provisional application No. 62/136,160, filed on Mar. 20, 2015.

(51) Int. Cl.
| | |
|---|---|
| *B63B 35/85* | (2006.01) |
| *B63B 35/79* | (2006.01) |
| *F16M 13/02* | (2006.01) |
| *A01K 97/10* | (2006.01) |
| *F16M 11/14* | (2006.01) |
| *F16M 11/20* | (2006.01) |
| *F16M 13/00* | (2006.01) |

(Continued)

(52) U.S. Cl.
CPC ............ *B63B 35/85* (2013.01); *A01K 97/10* (2013.01); *B63B 35/79* (2013.01); *B63B 35/7913* (2013.01); *F16M 11/14* (2013.01); *F16M 11/2085* (2013.01); *F16M 13/00* (2013.01); *F16M 13/02* (2013.01); *B63B 2035/738* (2013.01); *F16B 11/006* (2013.01)

(58) Field of Classification Search
CPC .................. B63B 38/85; B63B 38/79

USPC ........................................... 441/66
See application file for complete search history.

(56) References Cited

U.S. PATENT DOCUMENTS

| | | | | |
|---|---|---|---|---|
| 5,756,034 A | * | 5/1998 | Newton | .............. B29C 33/0033 114/357 |
| 5,816,873 A | | 10/1998 | Pestel | |
| 6,227,756 B1 | | 5/2001 | Dube et al. | |

(Continued)

FOREIGN PATENT DOCUMENTS

WO    WO 2014/110179 A1    7/2014

OTHER PUBLICATIONS

International Search Report and Written Opinion for Application No. PCT/US2016/023249 dated Jul. 14, 2016.

*Primary Examiner* — Lars A Olson
*Assistant Examiner* — Jovon Hayes
(74) *Attorney, Agent, or Firm* — Merchant & Gould P.C.

(57) ABSTRACT

Accessory mounting systems for stand up paddle boards are disclosed. In one example, the accessory mounting system includes a mounting plug secured to a stand up paddleboard, a accessory plate secured to the mounting plug, and one or more accessories secured to the accessory plate. In other examples, the accessory plate is provided with an adhesive backing and can be mounted and secured to the stand up paddle board, thereby allowing the accessory mounting system to be used on boards not having mounting plugs and/or at locations where mounting plugs are not present. In yet another example, a mounting track is provided instead of a accessory plate such that one or more accessories, such as fishing rod holder, can be slidably mounted on the stand up paddle board.

18 Claims, 13 Drawing Sheets

(51) Int. Cl.
  *F16B 11/00* (2006.01)
  *B63B 35/73* (2006.01)

(56) References Cited

U.S. PATENT DOCUMENTS

| | | |
|---|---|---|
| 7,303,320 B1 | 12/2007 | Ashley |
| 8,166,905 B2 | 5/2012 | Gratsch |
| 8,777,683 B2 | 7/2014 | Friedman |
| 2005/0029757 A1* | 2/2005 | Fiebing .................. A63C 10/14 |
| | | 280/14.24 |
| 2005/0051978 A1* | 3/2005 | Sabol ..................... A63C 10/14 |
| | | 280/14.24 |
| 2008/0087782 A1* | 4/2008 | Sutherland ............. B25H 3/006 |
| | | 248/231.9 |
| 2012/0227651 A1* | 9/2012 | Kuntzel ............... A63C 17/262 |
| | | 114/39.19 |
| 2016/0272286 A1* | 9/2016 | Caranto ................. B63B 35/85 |

* cited by examiner

120

ACCESSORY MOUNTING SYSTEM FOR A STAND UP PADDLE BOARD

CROSS REFERENCE TO RELATED APPLICATION

This application claims the benefit of U.S. Provisional Application No. 62/136,160, filed Mar. 20, 2015, and titled "Accessory Mounting System for a Stand Up Paddle Board," and U.S. Provisional Application No. 62/207,199, filed Aug. 19, 2015, and titled "Accessory Mounting System for a Stand Up Paddle Board," the disclosure of which is hereby incorporated herein by reference.

BACKGROUND

Stand up paddle boarding has become a popular recreational and competitive activity recently. In some uses, it is desirable for a rider of a stand up paddle board to be able to store items while paddle boarding. For example, those who fish while on a stand up paddle board have a need to securely store fishing tackle, fishing rods, and other items while not being directly used by the rider. Although some accessory mounting systems have been developed for this purpose, many such systems are prone to failure. As such, improvements are desired.

SUMMARY

Accessory mounting systems for stand up paddle boards are disclosed. In one example, the accessory mounting system includes a mounting plug secured to a stand up paddleboard, a accessory plate secured to the mounting plug, and one or more accessories secured to the accessory plate. In other examples, the accessory plate is provided with an adhesive backing and can be mounted and secured to the stand up paddle board, thereby allowing the accessory mounting system to be used on boards not having mounting plugs and/or at locations where mounting plugs are not present. In yet another example, a mounting track is provided instead of a accessory plate such that one or more accessories, such as fishing rod holder, can be slidably mounted on the stand up paddle board.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Figure 1:
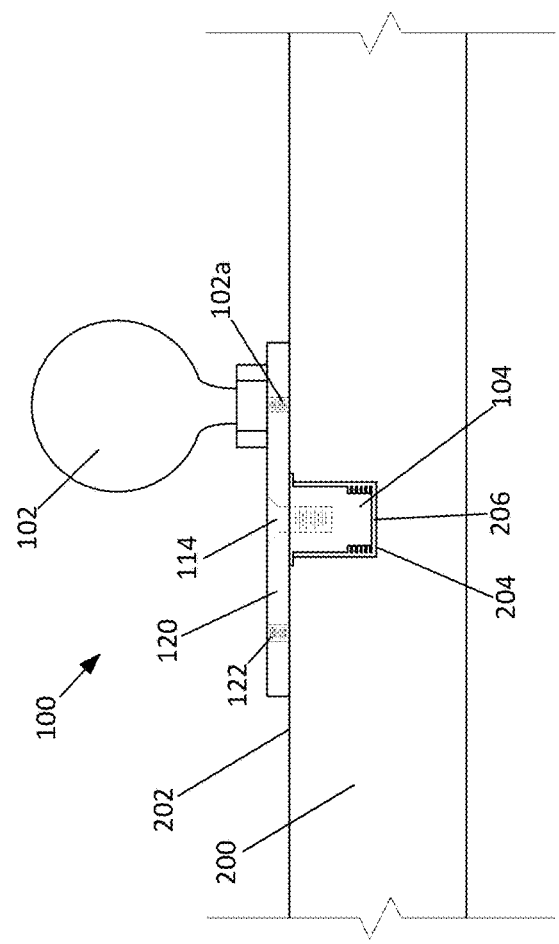
FIG. 1 is a schematic cross-sectional side view of a first embodiment of an accessory mounting system attached to a stand up paddle board, the accessory mounting system including a mounting plug, a accessory plate, and an accessory.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 15:
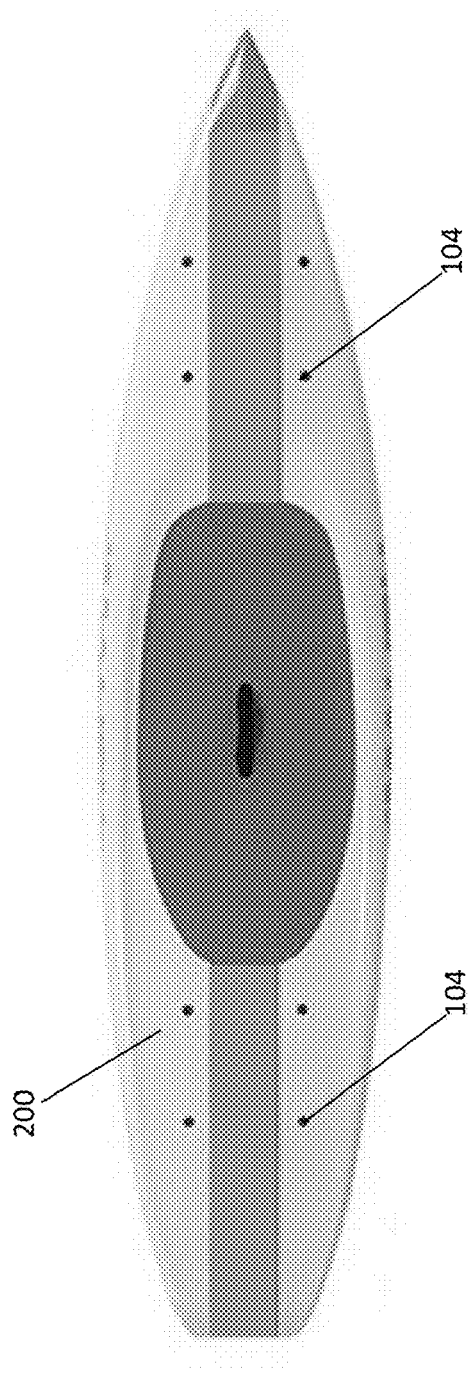
FIG. 15 is photographic top view of the stand up paddle board shown in FIG. 1 with mounting plugs mounted therein.

Referring to FIG. 1, an accessory mounting system 100 for a stand up paddle (SUP) board 200 having a top surface 202 is shown. The SUP board may be a solid board (e.g. foam core with fiberglass/carbon epoxy outer skin), a hollow rigid board (e.g. a carbon fiber and epoxy board), or an inflatable board. One example of a SUP board 200 is shown at FIG. 15. The accessory mounting system 100 includes, and is for supporting, a variety of different accessories 102. Non-limiting examples of accessories 102 are battery powered lights, d-rings, cinch straps, screws, knobs, cup holders, phone holders, camera mounting bases, mounts (e.g. RAM MOUNTS®), fishing rod holders, and other equipment. In the particular example shown at FIG. 1, a knob-type or RAM MOUNT® accessory 102 is shown to which additional accessory attachments may be made. In one aspect, the accessory 102 may be provided with a threaded projection 102a such that it can be threaded into a corresponding threaded aperture of a accessory plate 120, discussed later.

Figure 7:
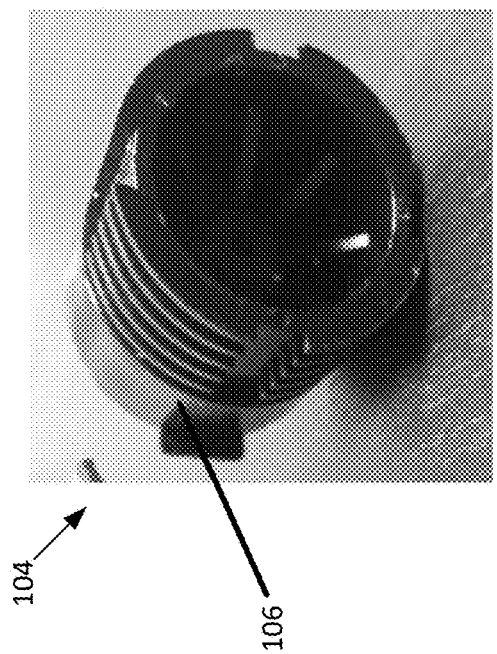
FIG. 7 is a bottom perspective photographic view of the mounting plug of the accessory mounting system shown in FIG. 1.
Figure 6:
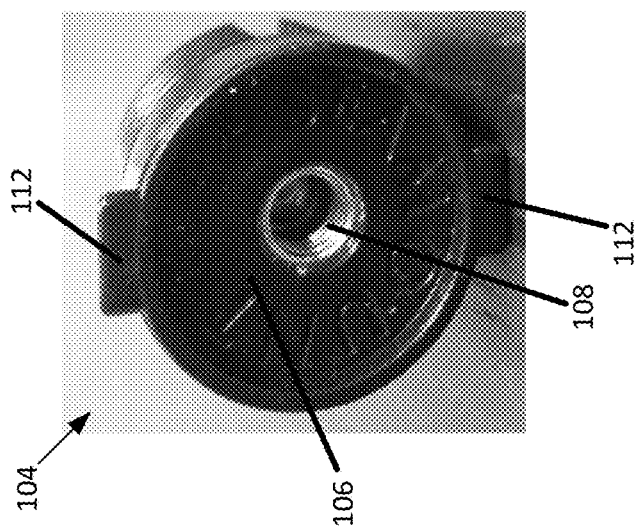
FIG. 6 is a top perspective photographic view of the mounting plug of the accessory mounting system shown in FIG. 1.
Figure 9:
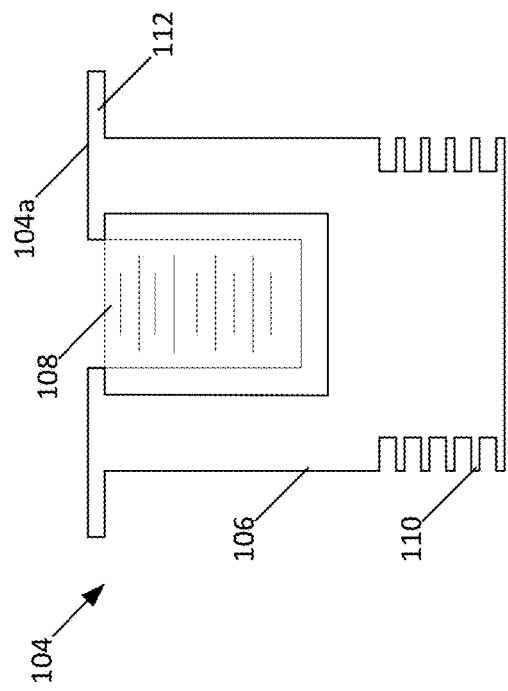
FIG. 9 is a schematic cross-sectional side view of the mounting plug of the accessory mounting system shown in FIG. 1.
Figure 8:
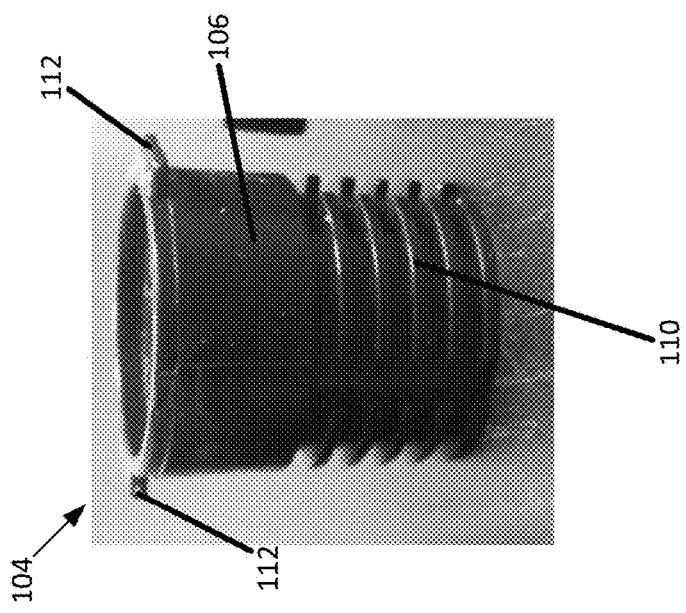
FIG. 8 is a side perspective photographic view of the mounting plug of the accessory mounting system shown in FIG. 1.

The accessory mounting system 100 also includes a mounting plug 104 which can be permanently secured to the SUP board, as shown at FIGS. 1 and 15. The mounting plug 104 forms a secure base for the accessory mounting system 100. As most easily viewed at FIGS. 6 to 9, the mounting plug 104 can include a main body 106 within which a threaded insert 108 is provided. In one example, the main body 106 is formed from a polymeric material, such as a plastic, and the threaded insert 108 is formed from stainless steel, wherein the main body 106 is molded onto the threaded insert 108. In one example, the main body 106 is generally hollow, as can be seen at FIG. 7. The main body 106 can be provided with ribs, barbs, or other structures 110 to enhance the connection to the SUP board 200. As shown, circumferntially directed ribs 110 are provided that are seprated by axially extending channels to result in four spaced rib segments for each rib 110. The main body 106 may also be provided with a flange or tabs 112 at one end to support the plug 104 within the SUP board 200 and to act as a stop to prevent further insertion into the SUP board 200. In one example, the SUP board is a solid structure having a bore 204 within which the plug 104 can be inserted. In such a case, the plug 104 can be secured to the board either mechanically or with an adhesive 206, such as an epoxy. Where an adhesive 206 is used, as shown in the example at FIG. 1, the structures 110 help to secure the plug 104 within the adhesive 206 and thus to the SUP board 200. In one example, the bore 204 is countersunk to support the flange or tabs 112 and to ensure that the top surface 104a of the plug 104 is generally aligned with the top surface 202 of the SUP board 200.

Figure 2:
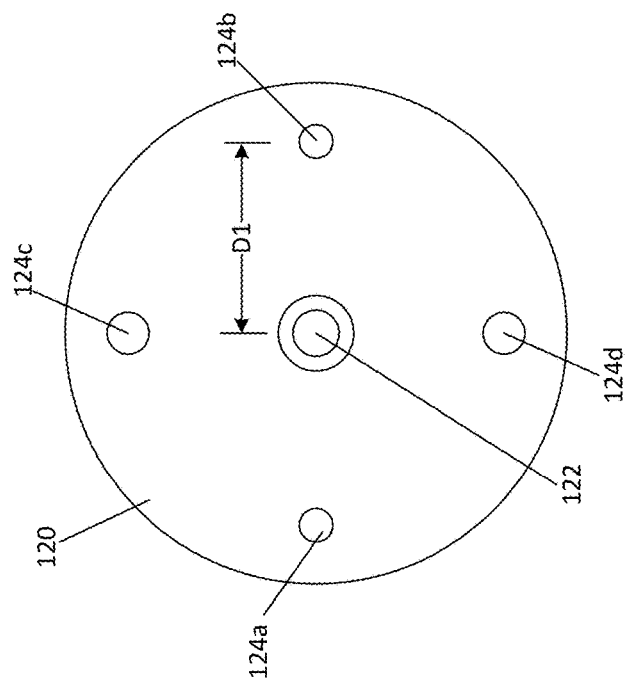
FIG. 2 is a schematic top view of the accessory plate of the accessory mounting system shown in FIG. 1.
Figure 3:
FIG. 3 is a perspective photographic view of the accessory plate shown in FIG. 1.
Figure 4:
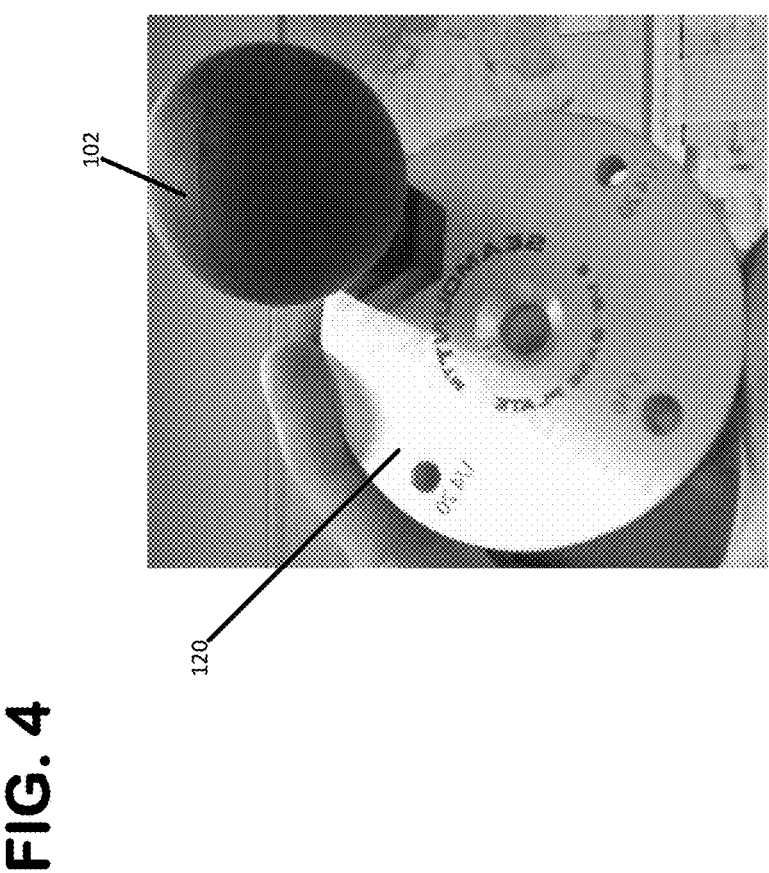
FIG. 4 is a perspective photographic view of the accessory plate shown in FIG. 1 with an accessory mounted to the accessory plate.
Figure 5:
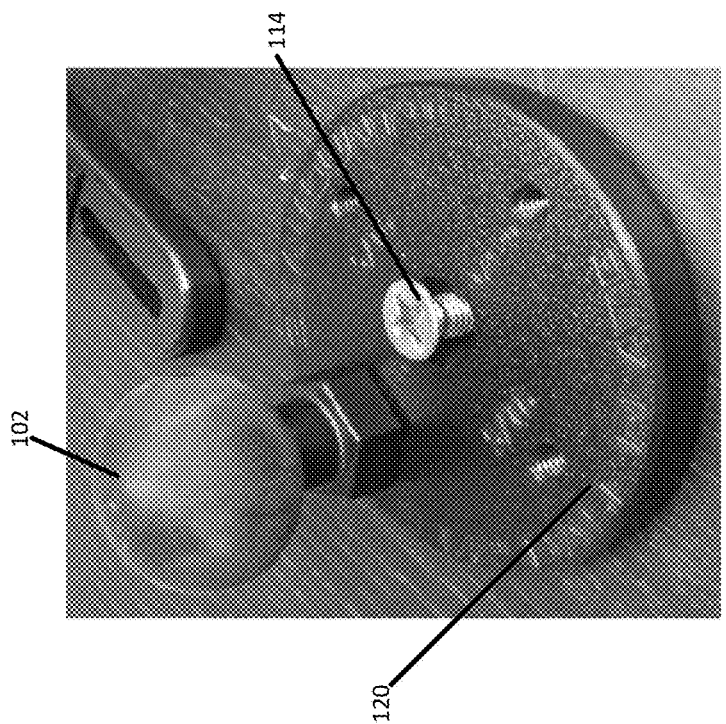
FIG. 5 is a perspective photographic view of the accessory plate shown in FIG. 1 having an accessory mounted to the accessory plate and including a fastener for attaching the accessory plate to the stand up paddle board.

As mentioned previously, the accessory mounting system 100 can also include a accessory plate 120, which is shown in further detail at FIGS. 2 to 5. The accessory plate 120 is configured as a relatively thick disk (e.g. thickness of between about ¼ of an inch and ½ of an inch and preferably about ⅜ of an inch) formed from a rigid material (e.g. aluminum, steel, stainless steel, polymeric material, etc.). In one aspect, the accessory plate 120 operates to distribute loads from the accessory 102 onto the SUP board 200 top surface such that the plug 104 experiences significantly less torqueing forces, as compared to a configuration in which an accessory 102 is directly mounted to the mounting plug 104. In one aspect, the accessory plate 120 includes a central mounting aperture 122 through which a fastener 114 can be used to mount the accessory plate 120 to the mounting plug 104 via the threaded insert 108. In one example, the aperture 122 is provided with a countersink to accept a correspondingly shaped screw such that the top portion of the plate 120 is flush. In one embodiment, the aperture 122 has a larger internal diameter than that of the fastener 114 such that the accessory plate 120 can freely or nearly freely rotate about the fastener 114. The accessory plate 120 is also shown as being provided with multiple threaded apertures 124 for receiving the threaded projection 102a of an accessory 102. Referring to FIG. 2, accessory plate 120 is shown as being provided with four such apertures 124a, 124b, 124c, 124d. The apertures can be provided with differently sized and/or thread configurations such that the same plate can be used with different type of accessory threads. For example, apertures 124a and 124b could be provided with a ¼ inch major diameter and 20 threads per inch (i.e. ¼-20) while apertures 124c and 124d could be provided with a ⁵⁄₁₆ inch major diameter and 20 threads per inch (i.e. ⁵⁄₁₆-20). Many other configurations are possible. For example, some or all of the apertures could be provided with metric threads while some or all of the other threads could be provided with standard threads. Also, the threaded insert 108 can be provided with a diameter that matches the projection 102a of one or more accessories 120 so that the accessories can be directly attached to the mounting plug 104 without the use of the mounting plate. In one embodiment, an accessory 102 having fastener 114 (i.e. projection 102a is same size as insert diameter 108) is used to secure the mounting plate 120 to the mounting plug 104.

As presented, the threaded apertures 124 are located at a distance D1 from the central aperture 122. As such, any force exerted on the accessory plate 120 by the accessory 102 is transferred to the opposite side of the accessory plate 120 such that the torque at the mounting plug 104 and fastener 114 is greatly minimized. Furthermore, the ability of the accessory plate 120 to rotate about the fastener 114 further allows the accessory plate to avoid or greatly reduce accepting oblique torque loads. In such instances, the accessory plate 120 will simply rotate when an oblique force is applied through the accessory 102. This configuration is greatly advantageous over systems in which an accessory mounts directly to a plug as all torque, including torque produced from oblique forces, is directly absorbed by the plug which can cause the plug to break out of the board. In one example, the accessory plate 120 has a diameter between about 2 inches and 6 inches, and preferably between about 2 inches and 4 inches, and preferably a diameter that is about 3 inches.

Figure 10:
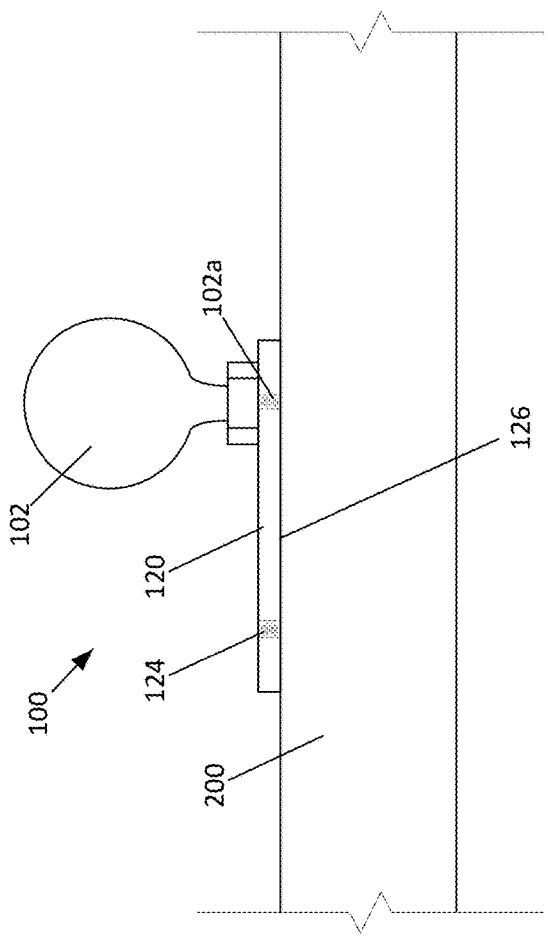
FIG. 10 is a schematic cross-sectional side view of a second embodiment of an accessory mounting system attached to a stand up paddle board, the accessory mounting system including a accessory plate and an accessory.
Figure 11:
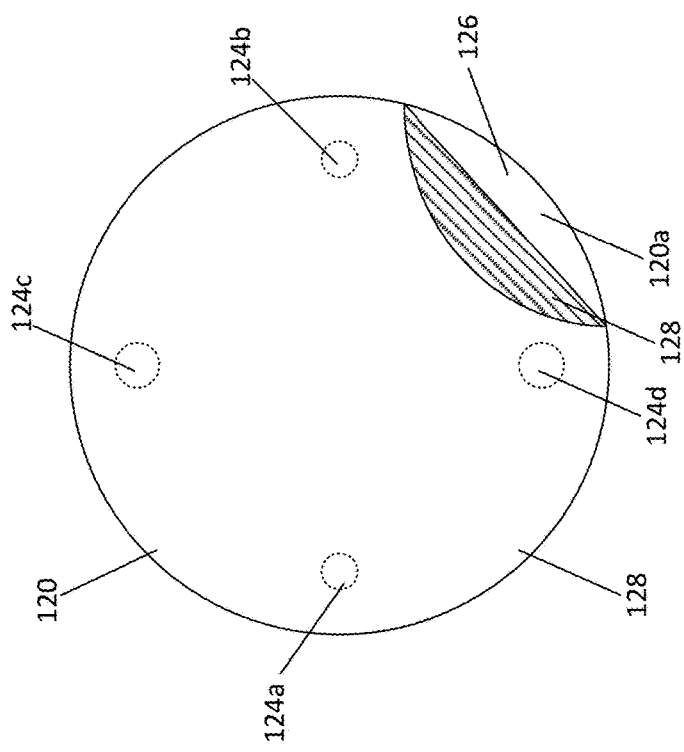
FIG. 11 is a schematic bottom view of the accessory plate shown in FIG. 10, with an adhesive covering shown as being partially removed.

Referring to FIGS. 10 and 11, a second embodiment of the accessory mounting system 100 is shown. The second embodiment is generally similar to the first embodiment, but does not utilize a mounting plug 104. Rather, the bottom side 120a of the accessory plate 120 is coated with an adhesive 126 which can be used to adhere the accessory plate 120 to the SUP board 200. In such an application, the accessory plate 120 can be made of a metal material, as suggested previously, or can be formed from a more flexible polymeric material for better conformity to the SUP board 200. Where a polymeric material is used, the material can be directly threaded for apertures 124 or can be provided with threaded inserts for the apertures 124. Referring to FIG. 11, it can be seen that a backing sheet 128 (partially peeled back) can be provided to protect the adhesive 126 from exposure until the accessory plate 120 is ready for mounting. This construction results in a "peel-and-stick" functionality and allows the accessory mounting system 100 to be used on any part of a SUP board 200, including the bottom side of the SUP board 200.

Figure 12:
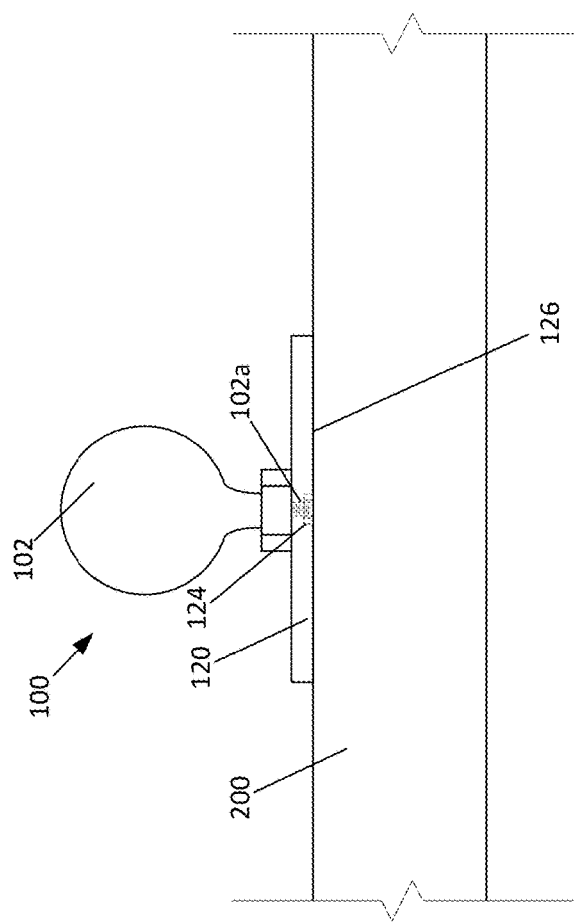
FIG. 12 is a schematic cross-sectional side view of a third embodiment of an accessory mounting system attached to a stand up paddle board, the accessory mounting system including a accessory plate and an accessory.
Figure 13:
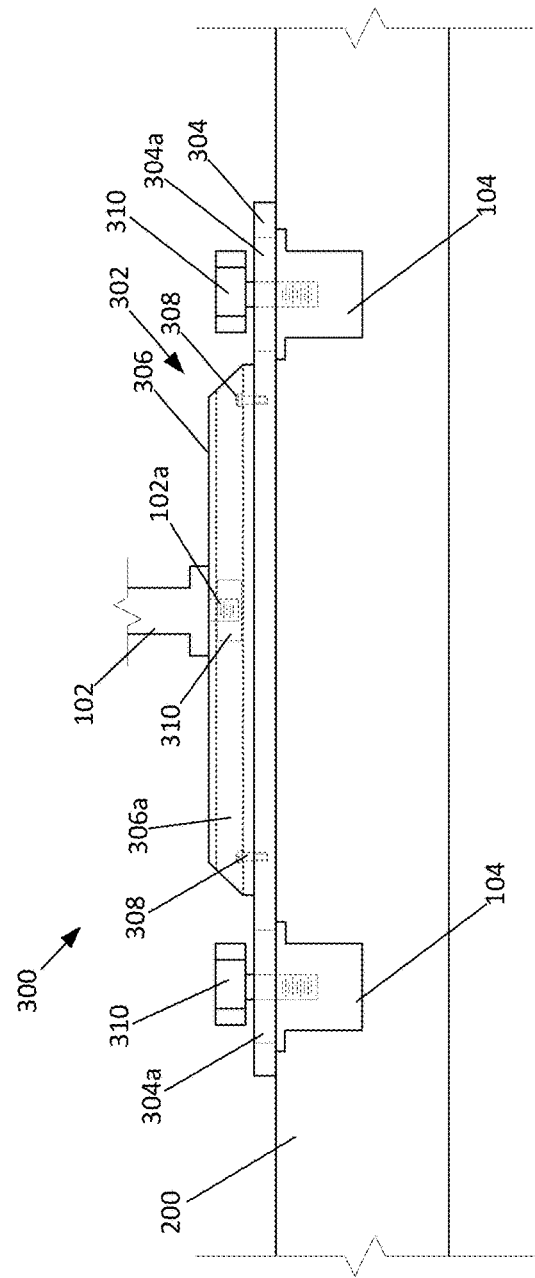
FIG. 13 is a schematic cross-sectional side view of a fourth embodiment of an accessory mounting system attached to a stand up paddle board, the accessory mounting system including a pair of mounting plugs, a mounting track, and an accessory.
Figure 14:
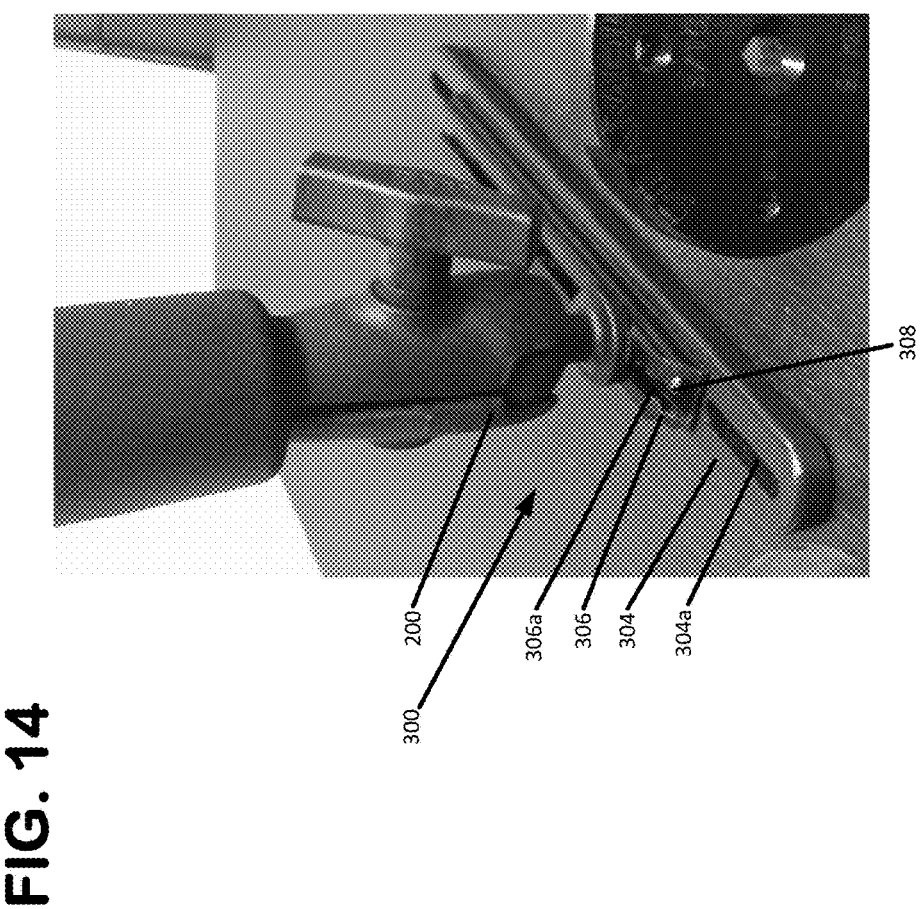
FIG. 14 is a photographic perspective view of the accessory mounting system shown in FIG. 10.

Referring to FIG. 12, a third embodiment of the accessory mounting system 100 is shown. This embodiment is generally the same as the embodiment shown in FIGS. 10 and 11, but with a different combination of alternative features. In this example, a single mounting aperture 124 is provided in the center of the accessory plate 120, which is formed from a polymeric material. As shown, the mounting aperture 124 is provided with a threaded insert (i.e. a backing nut) for receiving the threaded projection 102a of the accessory 102. This particular application is well suited to an inflatable SUP board 200, as the polymeric material of the accessory plate 120 can be easily bonded to the outer skin of the board and can readily accommodate repeated cycles of inflation and deflation. In this example, the accessory plate 120 can have a diameter between about 1 inches and 4 inches, and preferably between about 1 inches and 3 inches, and preferably a diameter that is about 2 inches.

Referring to FIGS. 10 and 11, a further embodiment of the accessory mounting system 300 is shown. Similar to the embodiment shown in FIG. 1, this embodiment utilizes mounting plugs 104 for securing the system 300 to the SUP board 200. However, instead of including a accessory plate 120, a slotted channel assembly 302 is provided to allow accessories to be able to be movably mounted onto the system 300. As shown, the slotted channel assembly 302 includes a base plate 304 to which a channel structure 306 is mounted via fasteners 308. Attachment can be accomplished by other means as well, such as with adhesives or welding. Alternatively, channel structure 306 and base plate 304 can be provided as an integrally formed single piece. In this embodiment, the threaded projection 102a threads into a slide block 310 which can slide within the channel 306a of the channel structure 306. The accessory 102 can be locked in place by rotating and thus tightening the accessory 102 to the channel structure 306. In one aspect, the base plate 304 is provided with slots 304a to allow the plate 304 to be connected to differently spaced mounting plugs 104. Fasteners 310, which may be provided as bolts or as knobs that can be manually adjusted, can be provided to secure the mounting plate 304 to the mounting plugs 104.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An accessory mounting system for a stand up paddle board, the accessory mounting system comprising:
   a) a mounting plug configured to be permanently secured within a recess of the stand up paddle board;
   b) a disk-shaped accessory plate having a central aperture and at least one threaded aperture spaced a first distance from the central aperture, the accessory plate being secured to the mounting plug by a fastener passing through the central aperture, wherein the accessory plate is rotatable about the fastener; and
   c) an accessory mounted to the threaded aperture of the accessory plate;
   d) wherein the mounting plug includes a threaded insert at a first end of the mounting plug into which the fastener extends, wherein the main body is formed from a polymeric material and the threaded insert is formed from stainless steel, and wherein the main body is molded onto the threaded insert.

2. The accessory mounting system of claim 1, wherein the mounting plug includes a pair of radially extending tabs at the first end of the mounting plug.

3. The accessory mounting system of claim 1, wherein the mounting plug includes a main body extending between the first end and a second end and wherein the main body includes a plurality of circumferentially directed ribs proximate the second end.

4. The accessory mounting system of claim 3, wherein the mounting plug includes a plurality of axially extending channels separating the circumferentially extending ribs into rib segments.

5. The accessory mounting system of claim 1, wherein the mounting plate is made from a steel material.

6. The accessory mounting system of claim 1, wherein the mounting plate central aperture has a larger internal diameter than an outer diameter of the fastener such that the accessory plate can freely rotate about the fastener.

7. A stand up paddleboard assembly including:
   a) a stand up paddleboard having a top surface and a bottom surface separated by a foam interior; and
   b) a mounting plug permanently secured within a recess of the stand up paddle board, the mounting plug including a threaded insert and a main body molded onto the threaded insert, wherein the mounting plug includes a pair of radially extending tabs proximate a first end of the mounting plug and a plurality of circumferentially directed ribs proximate a second opposite end of the mounting plug.

8. The stand up paddleboard assembly of claim 7, wherein the mounting plug main body is formed from a polymeric material and the threaded insert is formed from stainless steel.

9. The stand up paddleboard assembly of claim 7, further comprising:
   a) a disk-shaped accessory plate having a central aperture and at least one threaded aperture spaced a first distance from the central aperture, the accessory plate being secured to the mounting plug by a fastener passing through the central aperture, wherein the accessory plate is rotatable about the fastener.

10. The accessory mounting system of claim 1, wherein the mounting plate is made from a steel material.

11. The accessory mounting system of claim 10, wherein the mounting plate includes a plurality of threaded apertures, and wherein at least one of the plurality of threaded apertures has a different diameter than another of the apertures.

12. The stand up paddleboard assembly of claim 9, further comprising an accessory mounted to the threaded aperture of the disk-shaped accessory plate.

13. The stand up paddleboard assembly of claim 7, wherein the mounting plug includes a pair of mounting plugs and further includes a slotted channel assembly removably mountable to the pair of mounting plugs, the slotted channel assembly including a channel, and including an accessory mounted to the channel of the slotted channel assembly.

14. An accessory mounting system for a stand up paddle board, the accessory mounting system comprising:
   a) a disk-shaped accessory plate having at least one threaded aperture and having a surface opposite the at least one threaded aperture that is coated with an adhesive, the adhesive being for securing the accessory plate to a stand up paddle board; and
   b) an accessory mounted to the threaded aperture of the accessory plate.

15. The accessory mounting system of claim 14, wherein the accessory plate is formed from a polymeric material.

16. The accessory mounting system of claim 14, wherein the at least one threaded aperture includes a plurality of apertures.

17. The accessory mounting system of claim 14, wherein the adhesive on the disk-shaped accessory surface is covered by a removable backing.

18. An inflatable stand up paddleboard including:
   a) an inflatable body having an outer surface; and
   b) at least one of the accessory mounting systems of claim 14, wherein the adhesive secures the disk-shaped accessory plate to the outer surface.

* * * * *